United States Patent
Soria et al.

(10) Patent No.: US 9,333,534 B2
(45) Date of Patent: May 10, 2016

(54) METHOD OF FORMING A RELEASE LAYER

(75) Inventors: Meir Soria, Jerusalem (IL); Yevgenia Rudoy, Rishon Lezion (IL); Regina Guslitzer, Modi'in (IL); Raia Slivniak, Lod (IL); Oshra Raviv, Rishon Le-Ziyyon (IL)

(73) Assignee: Hewlett-Packard Indigo B.V., Maastricht (NL)

( * ) Notice: Subject to any disclaimer, the term of this patent is extended or adjusted under 35 U.S.C. 154(b) by 166 days.

(21) Appl. No.: 14/354,202

(22) PCT Filed: Oct. 27, 2011

(86) PCT No.: PCT/EP2011/068918
§ 371 (c)(1),
(2), (4) Date: Aug. 26, 2014

(87) PCT Pub. No.: WO2013/060377
PCT Pub. Date: May 2, 2013

(65) Prior Publication Data
US 2014/0369722 A1 Dec. 18, 2014

(51) Int. Cl.
*G03G 15/14* (2006.01)
*B05D 7/00* (2006.01)
*G03G 15/16* (2006.01)
*C08J 7/04* (2006.01)

(52) U.S. Cl.
CPC ............... *B05D 7/586* (2013.01); *B05D 7/582* (2013.01); *C08J 7/042* (2013.01); *G03G 15/162* (2013.01); *G03G 15/1605* (2013.01); *G03G 15/1625* (2013.01); *B41M 2205/10* (2013.01); *B41M 2205/38* (2013.01); *C08J 2333/08* (2013.01); *C08J 2483/04* (2013.01); *Y10T 428/31663* (2015.04)

(58) Field of Classification Search
CPC .................... B41M 2205/10; B41M 2205/38; G03G 15/1605; G03G 15/1625; B05D 7/582; C08J 2483/04; Y10T 428/31663; Y10T 428/21663
USPC ......... 428/32.51, 447, 448; 399/308; 427/152
See application file for complete search history.

(56) References Cited

U.S. PATENT DOCUMENTS

| 5,672,428 A | 9/1997 | Muschelweicz et al. |
| 6,410,134 B1 | 6/2002 | Park et al. |

(Continued)

FOREIGN PATENT DOCUMENTS

| EP | 0776928 | 6/1997 |
| EP | 0781823 | 7/1997 |

(Continued)

OTHER PUBLICATIONS

International Search Report and Written Opinion dated May 30, 2012; International Application No. PCT/EP2011/068918; Applicant Hewlett Packard Indigo B.V.

*Primary Examiner* — Bruce H Hess
(74) *Attorney, Agent, or Firm* — HP Inc. Patent Department

(57) ABSTRACT

A method of forming a silicone release layer on a substrate, for an intermediate transfer member of a digital offset printing system, the method including:
a) providing a curable first primer on the substrate;
b) providing a curable second primer on the substrate;
c) providing a curable silicone release formulation on the curable first and second primers; and
d) curing the first primer, the second primer and the release formulation.

15 Claims, 2 Drawing Sheets

(56) References Cited

U.S. PATENT DOCUMENTS

| | | |
|---|---|---|
| 6,551,716 B1 | 4/2003 | Landa et al. |
| 6,838,140 B1 | 1/2005 | Heeks et al. |
| 7,338,996 B2 | 3/2008 | Fehn et al. |
| 7,754,298 B2 | 7/2010 | Soria et al. |
| 2004/0092640 A1 | 5/2004 | Makino et al. |
| 2011/0123797 A1 | 5/2011 | Soria et al. |

FOREIGN PATENT DOCUMENTS

| | | |
|---|---|---|
| WO | 2008013521 | 1/2008 |
| WO | 2008073788 | 6/2008 |
| WO | 2012102412 | 8/2012 |

METHOD OF FORMING A RELEASE LAYER

BACKGROUND

The HP Indigo line of digital printing presses is based on digital offset color technology, which combines ink-on-paper quality with multi-color printing on a wide range of paper, foil and plastic substrates. These digital printing presses offer cost-effective short-run printing, on-demand service and on-the-fly color switching.

A digital offset printing system works by using digitally controlled lasers to create a latent image in the charged surface of a photo imaging plate (PIP). The lasers are controlled according to digital instructions from a digital image file. Digital instructions typically include one or more of the following parameters: image color, image spacing, image intensity, order of the color layers, etc. Special ink is then applied to the partially-charged surface of the PIP, recreating the desired image. The image is then transferred from the PIP to a heated blanket cylinder, and from the blanket cylinder to the desired substrate, which is placed into contact with the blanket cylinder by means of an impression cylinder. The ink is fluid on the heated blanket. Because of its role in transferring an image from the PIP to the ultimate substrate, the blanket may sometimes be referred to as an "intermediate transfer member" (ITM).

A detailed description of the operation of a typical digital offset printer is described in Hewlett-Packard (HP) White Paper Publication, "Digital Offset Color vs. Xerography and Lithography", for example. Specifically, an example of a digital printer that can be used to create the disclosed printed articles is HP's digital printing press Indigo Press™. 1000, 2000, 4000, or newer, presses, manufactured by and commercially available from Hewlett-Packard Company of Palo Alto, Calif., USA.

In order to apply pressure evenly in the course of transferring the ink and to accommodate slight variations in the surface of the substrate, the blanket is typically formed from a resilient material, such as synthetic rubber. Silicone is usually preferred, however, for the outermost layer of the blanket, because of its exceptional ink release properties. Such a silicone layer is an example of a release layer known in the art.

It is difficult to apply a silicone release layer on a rubber underlayer, however, because the desirable release properties of silicone and the properties of rubber also make it difficult to form chemical bonds at their respective surfaces. Known methods include applying a primer layer on the rubber, waiting for the primer to dry, or curing the primer, before then applying the silicone release layer. This is time-consuming and not an efficient method of manufacture.

Moreover, when forming a silicone release layer using for example a platinum catalyst in an addition-cure reaction, compounds from the underlying rubber layer or the body of the blanket cylinder under the blanket can inhibit or stop the curing reaction, by poisoning the catalyst. This is detrimental to the quality of the resulting silicone release layer.

BRIEF DESCRIPTION OF THE DRAWINGS

The accompanying drawing illustrates an example of the principles described herein and are a part of the specification. The illustrated example is merely an example and does not limit the scope of the claims.

DETAILED DESCRIPTION

In the following description, for purposes of explanation, numerous specific details are set forth in order to provide a thorough understanding of the present systems and methods. It will be apparent, however, to one skilled in the art that the present apparatus, systems and methods may be practiced without these specific details. Reference in the specification to "an example" or similar language means that a particular feature, structure, or characteristic described in connection with the example is included in at least that one example, but not necessarily in other examples.

In accordance with an example of the present invention, a method of providing a silicone release layer on a substrate is described. The method is suitable for providing the silicone release layer when manufacturing an intermediate transfer member of a digital offset printing system. An example of such a digital offset printing system will first be described.

Figure 1:
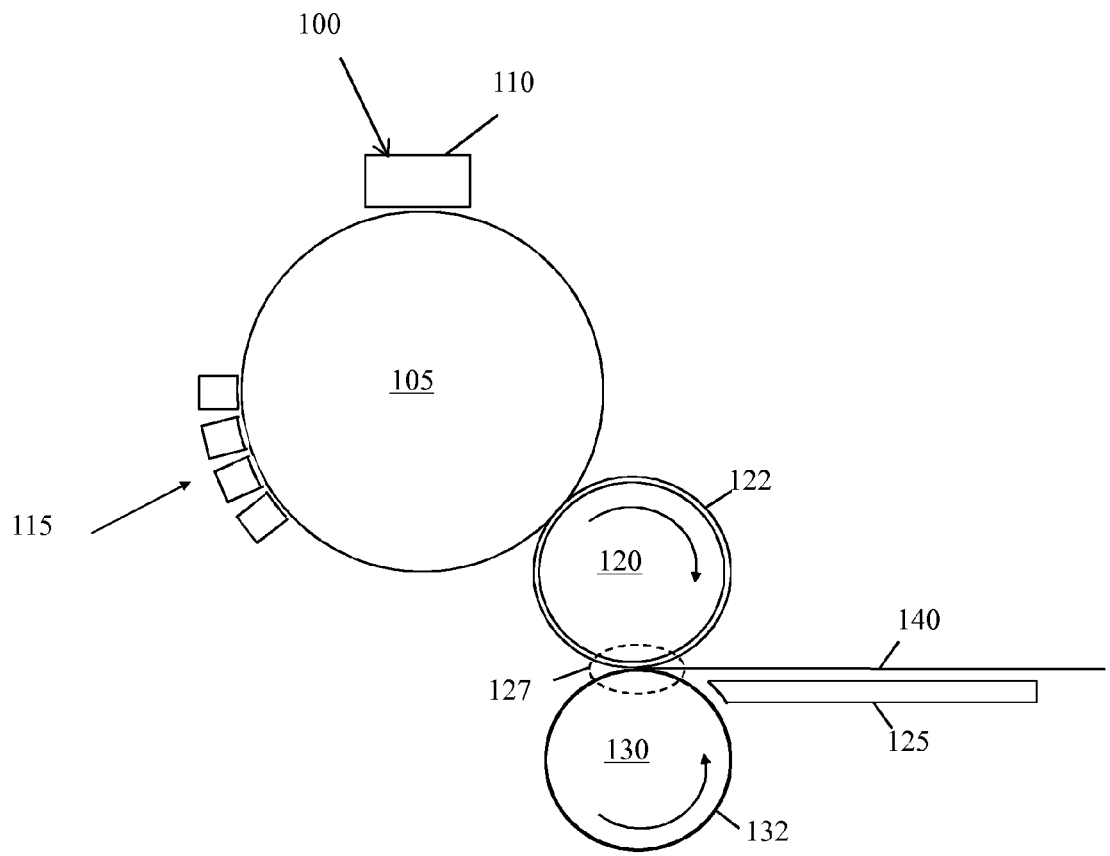
FIG. 1 is a diagram of an illustrative digital offset printing system.

FIG. 1 is a diagram of an illustrative digital offset printing system (100), which in this example is a digital Liquid Electro Photographic (LEP) printing system. The term "Liquid Electro Photographic" or "LEP" refers to a process of printing in which a liquid toner is applied onto a surface having a pattern of electrostatic charge, to form a pattern of liquid toner corresponding with the electrostatic charge pattern. This pattern of liquid toner is then transferred to at least one intermediate surface, and then to a print medium. During the operation of a digital LEP system, ink images are formed on the surface of a photo-imaging cylinder. These ink images are transferred to a heated blanket cylinder and then to a print medium. The photo-imaging cylinder continues to rotate, passing through various stations to form the next image.

In the illustrative digital LEP system (100), the desired image is communicated to the printing system (100) in digital form. The desired image may include any combination of text, graphics and images. The desired image is initially formed on the photo-imaging cylinder (105), transferred to a blanket (122) on the outside of the blanket cylinder (120), and then transferred to the print medium (140). The blanket (122) may otherwise be referred to as an intermediate transfer member (ITM).

According to one illustrative example, an image is formed on the photo-imaging cylinder (105) by rotating a clean, bare segment of the photo-imaging cylinder (105) under the photo charging unit (110). The photo charging unit (110) includes a charging device such as corona wire, charge roller, or other charging device and a laser imaging portion. A uniform static charge is deposited on the photo-imaging cylinder (105) by the photo charging unit (110). As the photo-imaging cylinder (105) continues to rotate, it passes the laser imaging portion of the photo charging unit (110) that dissipates the static charges in selected portions of the image area to leave an invisible electrostatic charge pattern that represents the image to be printed.

Ink is transferred onto the photo-imaging cylinder (105) by Binary Ink Developer (BID) units (115). There is one BID unit (115) for each ink color. During printing, the appropriate BID unit is engaged with the photo-imaging cylinder (105). The engaged BID unit presents a uniform film of ink to the photo-imaging cylinder (105). The ink contains electrically charged pigment particles which are attracted to the opposing electrical fields on the image areas of the photo-imaging cylinder (105). The ink is repelled from the uncharged, nonimage areas. The photo-imaging cylinder (105) now has a single color ink image on its surface.

The photo-imaging cylinder (105) continues to rotate and transfers the ink image to the ITM (122) of the blanket cylinder (120) which is heatable. The blanket cylinder transfers the image from the ITM to a sheet of media wrapped around the impression cylinder (130). As will be further described below, this process may be repeated for each of the colored ink layers to be included in the final image.

The print medium (140) enters the printing system (100) from the right, passes over a feed tray (125), and is wrapped onto the impression cylinder (130). As the print medium (140) contacts the ITM (122) of the blanket cylinder (120), the single color ink image is transferred to the print medium (140). The creation, transfer, and cleaning of the photo-imaging cylinder (105) is a continuous process, with hundreds of images being created and transferred per minute.

To form a single color image (such as a black and white image), one pass of the print medium (140) through the impression cylinder (130) and the blanket cylinder (120) completes the desired image. For a color image, the print medium (140) is retained on the impression cylinder (130) and makes multiple contacts with the blanket cylinder (120) as it passes through the nip (127). At each contact, an additional color plane may be placed on the print medium (140). The term nip refers to a region between two rollers where the rollers are in closest proximity. When a media sheet or other material passes through the nip, the distance between the two rollers can be adjusted to produce pressure on the media.

For example, to generate a four color image, the photo charging unit (110) forms a second pattern on the photo-imaging cylinder (105) which receives the second ink color from a second BID unit (115). As described above, this second ink pattern is transferred to the ITM (122) and impressed onto the print medium (140) as it continues to rotate with the impression cylinder (130). This continues until the desired image with all four color planes is formed on the print medium. Following the complete formation of the desired image on the print medium (140), the print medium (140) can exit the machine or be duplexed to create a second image on the opposite surface of the print medium (140). Because the printing system is digital, the operator can change the image being printed at any time and without manual reconfiguration.

Figure 2:
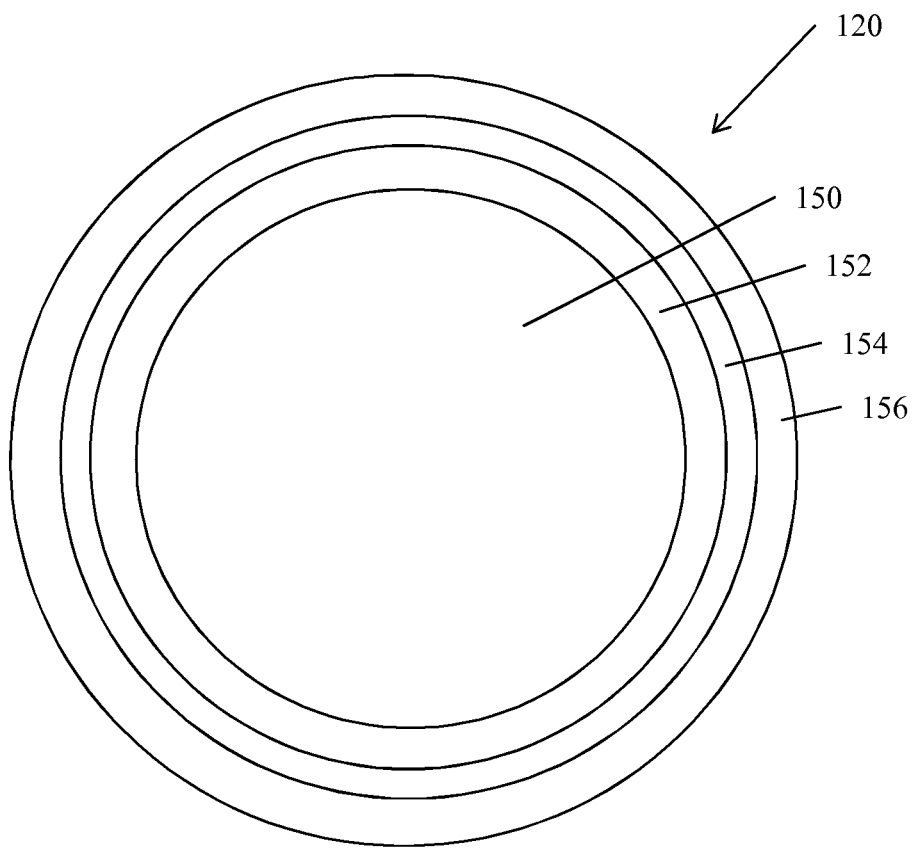
FIG. 2 is a cross sectional diagram of an example of an intermediate transfer member in accordance with an example of the invention.

FIG. 2 is a cross sectional diagram of an example of a blanket cylinder including an ITM in accordance with an example of the invention. The blanket cylinder (120) includes a base (150), for example a metal cylinder. The ITM comprises a rubber layer (152) disposed on the base (150), a primer layer (154) disposed on the rubber layer (152), and a silicone release layer (156) disposed on the primer layer (154). The rubber layer may otherwise be referred to as a substrate (152). In some examples, the rubber layer (152) may comprise an acrylic rubber comprising a blend of an acrylic resin Hi-Temp 4051 EP (Zeon Europe GmbH, Niederkasseler Lohweg 177, 40547 Düsseldorf, Germany) filled with carbon black pearls 130 (Cabot, Two Seaport Lane, Suite 1300, Boston, Mass. 02210, USA) and a curing system, which may comprise, for example, NPC-50 accelerator (ammonium derivative from Zeon). The acrylic rubber is at least partly cured.

Any suitable rubber can be used for the rubber layer 152, including but not limited to any of nitrile rubber (NBR), hydrogenated nitrile rubber (HNBR), polyurethane elastomer (PU), fluorocarbon elastomer, and fluorosilicone.

An illustrative example of a method of providing the silicone release layer on the substrate will now be described. The method is suitable for, but not limited to an ITM for a digital offset printing system. For example, the method of the present invention may be for providing a silicone release layer on a different substrate, which is not for an ITM. Following the illustrative example, specific examples are described.

A first primer, which is curable, is provided on the substrate, for example the outer surface of an acrylic rubber layer. The first primer may be applied using a rod coating process. The first primer comprises an organosilane and a first catalyst comprising titanium, for example an organic titanate or a titanium chelate. In an illustrative example the organosilane is an epoxysilane, for example 3-glycidoxypropyl trimethoxysilane (available from ABCR GmbH & Co. KG, Im Schlehert 10 D-76187, Karlsruhe, Germany, product code SIG5840) and the first catalyst is for example Tyzor® AA75 (available from DuPont, 1007 Market St., Wilmington, Del., USA). The first primer is curable by for example a condensation reaction.

A second primer, which is curable, is also provided on the substrate. A rod coating process may be used. The second primer comprises an organosilane and a second catalyst. The second catalyst is different from the first catalyst and for example comprises platinum, and is for example a Karstedt catalyst with for example 9% platinum in solution (available from Johnson Matthey, 5th Floor, 25 Farringdon Street, London EC4A 4AB, United Kingdom) or SIP6831.2 catalyst (available from Gelest, 11 East Steel Road, Morrisville, Pa. 19067, USA). In an illustrative example the organosilane is a vinyl silane, for example vinyltriethoxysilane (VTEO, available from Evonik, Kirschenallee, Darmstadt, 64293, Germany), vinyltriethoxysilane, an allyl silane or an unsaturated silane. In some examples the second primer may comprise a further organosilane, for example an epoxysilane such as 3-glycidoxypropyl trimethoxysilane (available from ABCR GmbH & Co. KG). The second primer is curable by for example an addition reaction, and is therefore cured by a different mechanism from the first primer.

In this example, the second primer is provided on the first primer already applied to the substrate. Therefore, the second primer is supported by the substrate, and is considered to be on the substrate despite not adjoining the substrate. In other examples, the second primer may be applied directly onto the substrate and the first primer may then be applied on the second primer; in that case the first primer is on the substrate but does not adjoin the substrate. In other examples, the first primer and the second primer may be mixed together and then applied as a mixture of the first and second primers to the substrate. The substrate is uncured when the first and second primers are provided thereon.

A silicone release formulation is provided on the first and second primers. A rod coating process may be used. The substrate may be uncured at this time. The first and second primers after being provided on the substrate may be at least partly absorbed in the uncured substrate material. The silicone release formulation is provided for example with a layer thickness of from 1.5 to 12 micrometers. In this example the silicone release formulation comprises a vinyl silicone oil and a silicon hydride crosslinker. The silicone release layer may also comprise at least one of: a catalyst comprising platinum, for example a Karstedt type catalyst or a Pt(O) complex with vinylsiloxane ligands; an inhibitor, for example an acetylenic alcohol, tetramethyltetravinylcyclotetrasiloxane or tetramethyldivinyldisiloxane; and a filler, for example amorphous silica or carbon black. In an illustrative example the silicone release layer comprises a vinyl-terminated polydimethyl siloxane, for example Polymer VS 500 having a viscosity at 25° C. of 500 mPa·S, and a vinyl content of 0.14 mmol/g (available from Hanse Chemie, Charlottenburger Straβe 9, 21502 Geesthacht, Germany); a vinyl-terminated with in-chain vinyl functionality polydimethyl siloxane, for example Polymer XPRV 5000 having a viscosity at 25° C. of 3000 mPa·S, and a vinyl content of 0.4 mmol/g (available from Hanse Chemie); a silicone polymer containing silicon-hydride groups, for example Crosslinker 210 with a SiH content of 4.2 mmol/g (available from Hanse Chemie); a divinyl tetramethyl disiloxane-platinum(0) complex, for example Catalyst 510 (available from Hanse Chemie); and an alkinol, for example Inhibitor 600 (available from Hanse Chemie). The silicone release formulation is for example curable by an addition reaction.

After providing the silicone release formulation, the first primer, the second primer and the silicone release formulation are cured. The curing may be performed simultaneously, for example by leaving the substrate with the applied first primer, second primer and silicone release formulation for 15 minutes at Room Temperature, followed by curing for 1 hour at 120° C. The curing for 1 hour at 120° C. cures the substrate material, for example the acrylic rubber.

After curing, the substrate (152) has thereby been provided with the silicone release layer (156), adhered by the primer layer (154) comprising a first primer material which is the cured first primer and a second primer material which is the cured second primer. In accordance with the illustrative example, the first primer material may comprise titanium and the second primer material may comprise platinum as a consequence of the first and second catalysts in the first and second primers.

The method of providing the silicone release layer of the invention is advantageous. The resulting silicone release layer has excellent adhesion to the underlying substrate. Moreover, the method of the invention reduces or stops inhibition of curing of the silicone release formulation, by limiting or preventing catalyst poisoning compounds from the body or substrate of the blanket cylinder from reaching the second primer catalyst, which could otherwise limit or stop curing of the silicone release formulation. Without being limited to any theory, it is believed that the consequent providing of the first and then second primers provides the excellent adhesion and forms a barrier against the poisonous inhibitors. The combination of using different first and second catalysts and/or a different curing reaction in the first and second primers is believed to contribute to the excellent adhesion and inhibition reduction properties. It is envisaged that, by changing the amount of catalyst in the first or second primer, the effectiveness of the barrier to reduce inhibition may be controlled. Furthermore, by curing the first primer, the second primer and the silicone release formulation in one method step, a more efficient method of providing a silicone release layer on a substrate is provided, compared with prior art techniques requiring curing or drying of a primer before applying a silicone release layer.

Specific examples of the method of providing a silicone release layer according to the invention will now be described.

Example 1

Using a rod coating process, the primer (P17 see table 1.1 below) was coated on an uncured acrylic layer substrate. In this example the first primer and the second primer are mixed together for applying to the substrate. An addition cure silicone release formulation (RL26 see table 1.2 below) was then coated on the applied primer mixture.

TABLE 1.1

| Primer (P17) | Supplier | Wt % |
|---|---|---|
| 3Glycidoxypropyl) trimethoxysilane (SIG 5840) | ABCR | 50 |
| Vinyltriethoxysilane (VTEO) | Evonik | 35 |
| Tyzor AA75 | Dupont | 10 |
| SIP6831.2 (Platinum Catalyst) | Gelest | 5 |

TABLE 1.2

| Release (RL26) | Supplier | Wt % |
|---|---|---|
| Polymer VS 500 | Hanse Chemie | 69.3 |
| Polymer XPRV 5000 | Hanse Chemie | 17.3 |
| Crosslinker 210 | Hanse Chemie | 8.7 |
| Catalyst 510 | Hanse Chemie | 0.4 |
| Inhibitor 600 | Hanse Chemie | 4.3 |

The applied primer and silicone release formulation can be left for 15 minutes at Room Temperature (RT) to allow the condensation cure to start. The resulting ITM was then fully cured for 1 hour at 120° C.

The adhesion of the silicone release layer on the substrate was then tested with a wet abrasion test, involving soaking the ITM in isopar for 1 minute at RT and then abrading with a cloth. A score of 4/4 was obtained, marked using the scale from 1 to 4 below.

Scores for wet abrasion test:
1 Easy—Release is easily removed without any effort;
2 Medium—the silicone release layer is removed under small effort;
3 Good—the silicone release layer is removed after a great effort; and
4 Excellent—the silicone release layer cannot be removed.

Example 2

The same primer and method was used as in Example 1, but using another platinum catalyst from Johnson Matthey; see Table 2. Excellent adhesion of the silicone release layer on the acrylic substrate was obtained, scoring 4/4.

TABLE 2

| Primer | supplier | Wt % |
|---|---|---|
| 3Glycidoxypropyl) trimethoxysilane (SIG 5840) | ABCR | 54 |
| Vinyltriethoxysilane (VTEO) | Evonik | 35 |
| Tyzor AA75 | Dupont | 10 |
| Karstedt Catalyst (9% Platinum)) | Johnson Matthey | 1 |

Example 3

In this example the first and second primers are applied separately on the acrylic rubber substrate. The first primer is a condensation cure system that contains a titanium condensation cure catalyst (Tyzor AA75); see table 3.1. The second primer is applied afterwards and uses a platinum catalyst for an addition cure system; see table 3.2. An addition cure silicone release formulation (see table 3.3) was then coated afterwards.

The blanket was then fully cured for 1 hour at 120° C. The adhesion of the silicone release layer on the substrate was tested with the wet abrasion test, achieving a score of 4/4.

An advantage of the silicone release formulation of example 3 is that it has a very long pot life (several days), allowing it to be stored separately and reused easily.

TABLE 3.1

| Primer 1 | supplier | Wt % |
|---|---|---|
| 3Glycidoxypropyltrimethoxysilane (SIG 5840) | ABCR | 82 |
| Tyzor AA75 | Dupont | 18 |

TABLE 3.2

| Primer 2 | supplier | Wt % |
|---|---|---|
| 3Glycidoxypropyltrimethoxysilane (SIG 5840) | ABCR | 73 |
| Vinyltrimethoxysilane (VTMO) | Evonik | 23 |
| Karstedt Catalyst (9% Platinum) | Johnson Matthey | 4 |

TABLE 3.3

| Release | supplier | Wt % |
|---|---|---|
| Polymer VS 2000 | Hanse Chemie | 93.5 |
| Crosslinker 101 | Hanse Chemie | 4.7 |
| Inhibitor 600 | Hanse Chemie | 1.8 |

The preceding description has been presented only to illustrate and describe examples of the principles described. This description is not intended to be exhaustive or to limit these principles to any precise form disclosed. Many modifications and variations are possible in light of the above teaching.

What is claimed is:

1. A method of forming a silicone release layer on a substrate, for an intermediate transfer member of a digital offset printing system, the method including:
   a) providing a curable first primer on the substrate;
   b) providing a curable second primer on the substrate;
   c) providing a curable silicone release formulation on the curable first and second primers; and
   d) curing the first primer, the second primer and the release formulation,
   wherein the first primer is curable by a condensation reaction and the second primer is curable by an addition reaction.

2. A method according to claim 1, wherein the first primer comprises a first catalyst and the second primer comprises a second catalyst.

3. A method according to claim 2, wherein the first catalyst comprises titanium and the second catalyst comprises platinum.

4. A method according to claim 1, wherein the first primer comprises a first catalyst and an epoxysilane, and the first catalyst comprises an organic titanate or a titanium chelate.

5. A method according to claim 1, wherein the second primer comprises a second catalyst, the second primer further comprises at least one of a vinyl silane, an allyl silane and an unsaturated silane, and the second catalyst comprises a Karstedt catalyst or a SIP6831.2 catalyst.

6. A method according to claim 1, wherein the silicone release formulation comprises at least one of a vinyl silicone oil, a silicon hydride crosslinker, a Karstedt catalyst, a catalyst comprising a Pt(O) complex with vinylsiloxane ligands, an inhibitor, an acetylenic alcohol, tetramethyltetravinylcyclotetrasiloxane, tetramethyldivinyldisiloxane, a filler, amorphous silica, carbon black, a vinyl-terminated polydimethyl siloxane, a vinyl silicone, a divinyl tetramethyl disiloxane-platinum(0) complex, and an alkinol.

7. A method according to claim 1, wherein the silicone release formulation is curable by an addition reaction using a catalyst comprising platinum.

8. A method according to claim 1, wherein in steps a), b) and c) the substrate comprises an uncured acrylic rubber which is cured after performing steps a), b) and c).

9. A method according to claim 1, wherein the curable first primer and the curable second primer are provided in steps a) and b) together as a mixture of the curable first and second primers.

10. The method of claim 1, wherein curing the first primer, the second primer and the release formulation is performed simultaneously.

11. The method of claim 1, wherein curing the first primer, the second primer, and the release formation comprises:
   curing the first primer, the second primer, and the release formulation at 120° Celsius for one hour.

12. An intermediate transfer member for a digital offset printing system, comprising a substrate, a primer layer on the substrate, the primer layer comprising a first primer material and a second primer material, and a silicone release layer on the primer layer, wherein the first primer material comprises titanium and the second primer material comprises platinum.

13. An intermediate transfer member according to claim 12, wherein the first primer material comprises an epoxysilane cured with a first catalyst comprising an organic titanate or a titanium chelate, and the second primer material comprises at least one of a vinyl silane, an allyl silane and an unsaturated silane cured with a second catalyst comprising a Karstedt catalyst or a SIP6831.2 catalyst.

14. An intermediate transfer member according to claim 12, wherein the substrate comprises an acrylic rubber.

15. A digital offset printing system comprising an intermediate transfer member in accordance with claim 12.

* * * * *